Dec. 8, 1925. Re. 16,222

H. R. ELLIS

WINDOW SCREEN

Original Filed July 3, 1922 2 Sheets-Sheet 1

INVENTOR

H.R.Ellis

BY

Lewis D. Quesada

ATTORNEY

Dec. 8, 1925. Re. 16,222
H. R. ELLIS
WINDOW SCREEN
Original Filed July 3, 1922 2 Sheets-Sheet 2
Fig. 4.
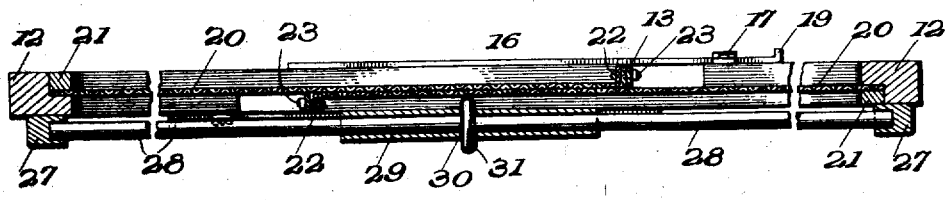
Fig. 5.
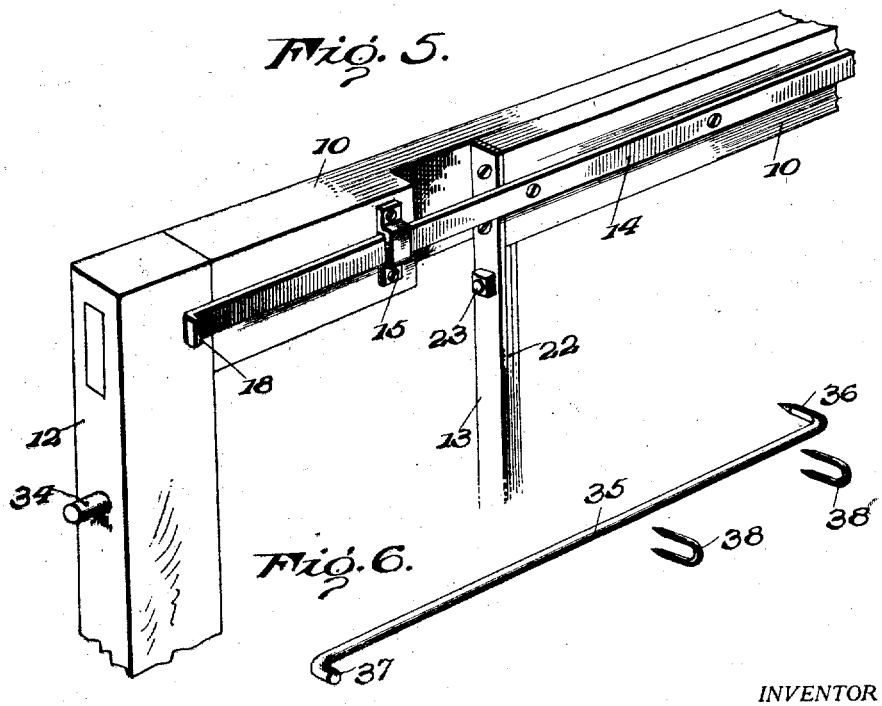
Fig. 6.
INVENTOR
H. R. Ellis
BY Irving L. Quesada
ATTORNEY Reissued Dec. 8, 1925.

Re. 16,222

UNITED STATES PATENT OFFICE.

HORACE R. ELLIS, OF MEADVILLE, PENNSYLVANIA.

WINDOW SCREEN.

Original No. 1,442,657, dated January 16, 1923, Serial No. 572,622, filed July 3, 1922. Application for reissue filed January 3, 1924. Serial No. 684,240.

*To all whom it may concern:*

Be it known that I, HORACE R. ELLIS, a citizen of the United States, residing at Meadville, in the county of Crawford and State of Pennsylvania, have invented certain new and useful Improvements in Window Screens, of which the following is a specification.

This invention relates to extensible screens and an important object is to provide simple means to slidably connect the sections of the screen in such a manner that warping of the screen or continued dampness will not cause the sections to stick.

A further object is to provide an extensible screen wherein the overlapped portions of the sections of the screen have their opposed sides flatly and smoothly in contact with each other and entirely free of a tongue and groove or other interlocking connection which would be likely to interfere with the free movement of the sections with relation to each other.

A further aim is to provide an extensible screen having simple means whereby the sections may be locked in an adjusted position from the inside.

In the accompanying drawing,

Figure 4 is a horizontal section taken on line 4—4 of Figure 1.

Figure 5 is a fragmentary perspective illustrating the means to connect the sections for free sliding movement, the view also illustrating the fact that the opposed sides of the overlapped portions of the sections are flat and are in sliding contact with each other.

Figure 6 is a group perspective illustrating a modified form of connecting member.

Figure 1:
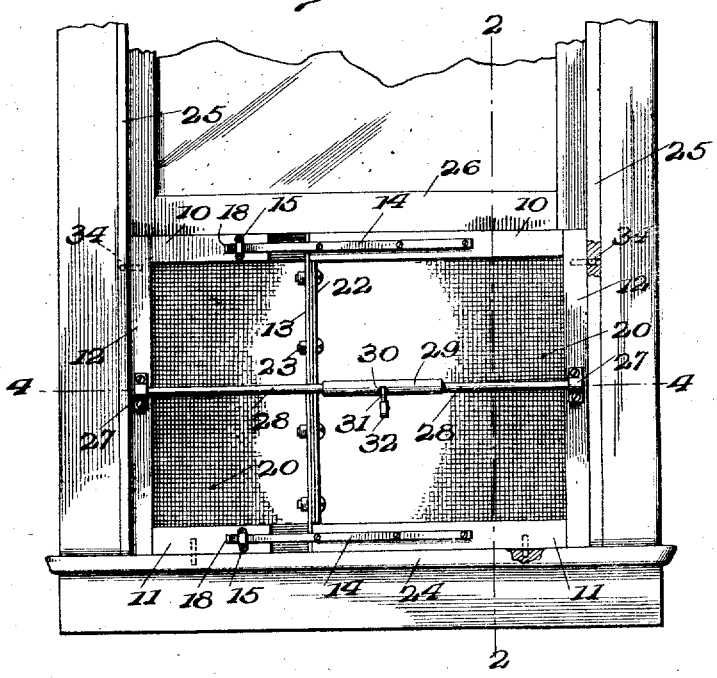
Figure 1 is an elevation of the screen applied.

In the drawing the numerals 5 and 6 designate a pair of coacting sections having upper overlapping rails 10 and similar lower overlapping rails 11, the said rails 10 and 11 being connected at their ends to the stiles 12. In carrying out the invention the wire is attached by a suitable means at three of its edges to the rails 10 and 11 and the outer stiles 12. The fourth edge of the wire may be secured to an attaching member 22 which is in turn secured to an inner metallic strip or stile 13 by means of bolts 23.

Particular attention is directed to Figure 5 which illustrates that the inner terminal portions of the sections 5 and 6 are abruptly decreased in thickness and are overlapped so that the thickness of the screen frame at the overlapped portions of the sections will be approximately the same as the thickness of the frame elsewhere. Figure 5 also illustrates that the opposed surfaces of the overlapping portions of the sections are perfectly flat and are in sliding contact with each other and are free of a tongue and groove or other interlocking connection which would be likely to prevent the free sliding movement of one section with relation to the other section. By abruptly reducing the thickness of the terminal portions of the sections shoulders 7 are provided in the path of travel of the ends of the sections so that the extent to which the screen may be closed or collapsed is limited.

By further reference to Figure 5 it will be seen that the section 5 has its upper and lower rails 10 and 11 respectively provided with combined guide and connecting strips 14 rigidly secured at spaced points to the stiles by fastening devices 4. The strips 14 are extended substantial distances beyond the end of the section 5 and are slidable through keepers 15 in the nature of metallic straps secured to the section 6.

On the other side of the screen the section 5 may be provided with the keepers while the section 6 may be provided with the strips 14. By reason of the particular means for connecting the sections of the screen, the screen may be quickly and conveniently adjusted. No binding or sticking will occur even though the sections may warp or swell as a result of exposure or continued use. As previously stated the members 14 and 15 are of metal and consequently will at all times have free sliding connection. The arrangement illustrated and described not only provides an extremely free sliding movement between the sections but also makes the screen unusually strong and able to withstand the hard usage to which extensible screens are ordinarily subjected. The extension of the screen is limited by the out turned ends 18 of the strips 14 so it will be seen that the strips 14 and the guide members 15 not only slidably connect the sections but also limit the extension of the same.

The sections of the screen and more particularly the stiles 12 of the same may be provided with socket members 27 to detachably receive locking bars 28 the inner ends of which are adapted to be received in a connecting sleeve 29. Figure 4 illustrates that the ends of the bars or rods 28 are arranged in spaced relation to permit of the passage of the bolt 31 through openings 3 in the sleeve. The bolt 31 may form a part of a padlock 32. The locking mechanism 28, 29, and 32 is, of course, located on the inner side of the screen and is inaccessible to one on the outside of the screen.

To remove the screen it is only necessary to detach the padlock and move the sleeve wholly upon one of the rods 28. This permits one or both of the rods to be detached from the socket members 27 so that the screen may be contracted.

Figure 2:
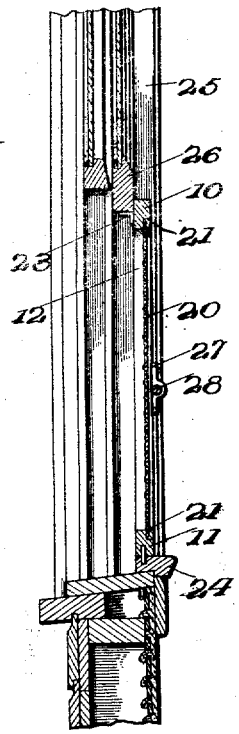
Figure 2 is a vertical sectional view taken on line 2—2 of Figure 1.
Figure 3:
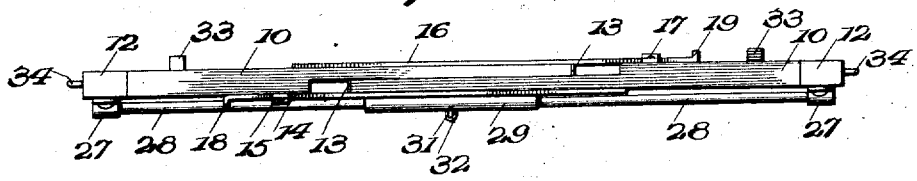
Figure 3 is a top plan view of the screen.

Figures 2 and 3 illustrate that the screen may be mounted between the sash guides 25 and the stiles 12 may be provided with dowel pins 34 to enter sockets in the guides 25. The outer sides of the rails 10 are provided with small L-shaped brackets 33 which engage the lower end of the sash 26 to hold the window up and to cooperate in holding the screen in place.

In the modified form of the invention illustrated in Figure 6 the guide strips 35 may be cylindrical in cross section and may be provided at their inner ends with inturned bends which define attaching members 36. The attaching members 36 may be driven into the horizontal rails of the screen and staples 38 may also be employed to secure the strips 35 immovably to the associated section. The outer ends of the strips 35 are extended laterally to provide stops 37 corresponding to the stops 18.

Having thus described my invention, what is claimed is:—

1. A screen comprising a pair of slidably related sections having overlapping rails, the adjoining side faces of which are flush with each other, rods rigidly secured to the side faces of certain of said rods and each extending a substantial distance beyond the same into overlapping relation with a side face of the adjacent rail, and keepers carried by the side faces of certain of the rails and shaped to slidingly receive the extended portions of said rods.

2. A screen comprising a pair of slidably related sections having overlapping rails, the adjoining side faces of which are flush with each other, rods secured to the side faces of certain of said rails and each extending a substantial distance beyond the same into overlapping relation with the side face of the adjacent rail, and keepers carried by the side faces of certain of the rails and slidably receiving the extended portions of said rods, one end of one of said rods being provided with a stop adapted to engage one of the keepers and limit the extension of the screen.

3. A screen comprising a pair of slidably related sections having overlapping rails, rods rigidly secured to the side faces of certain of said rails and each extending a substantial distance beyond the same into overlapping relation with a side face of the adjacent rail, and keepers carried by the side faces of certain of the rails and shaped to slidingly receive the extended portions of said rods, said rods being flatly in contact with the faces of the rails and co-operating with said keepers to hold the ends of each of the rails in engagement with the adjacent portions of the co-acting rails.

4. The construction set forth in claim 1, said rods and said keepers being located on opposite sides of said rails to hold the opposed faces of the rails lightly in sliding contact with each other and to hold the ends of each rail against outward movement.

5. A window screen in coacting overlapping sections, rods attached to the respective sections, with their confronting ends in spaced relation, a sleeve engaging the confronting ends of the rods and having transverse apertures corresponding in length to the space between the ends of the rods, and a locking element disposed through the slots and engaged by the ends of the rods.

6. A window screen in coacting overlapping sections, rods attached to the sections with their confronting ends in spaced relation, a sleeve engaging the confronting ends of the rods and having transverse apertures corresponding in length to the space between the ends of the rods, a locking element disposed through the slots and engaged by the ends of the rods, guide rods attached to one of said sections, and guide keepers attached to the other section and slidably engaged by said guide rods.

HORACE R. ELLIS.